(12) United States Patent
Gnutzmann

(10) Patent No.: US 10,395,399 B2
(45) Date of Patent: Aug. 27, 2019

(54) METHOD FOR IMPROVING THE PRINT QUALITY OF GRAPHIC ELEMENTS

(71) Applicant: HEIDELBERGER DRUCKMASCHINEN AG, Heidelberg (DE)

(72) Inventor: Frank Gnutzmann, Gettorf (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 6 days.

(21) Appl. No.: 15/672,847

(22) Filed: Aug. 9, 2017

(65) Prior Publication Data

US 2018/0047190 A1    Feb. 15, 2018

(30) Foreign Application Priority Data

Aug. 10, 2016    (DE) .......... 10 2016 214 811

(51) Int. Cl.
*G06F 17/00*    (2019.01)
*G06T 11/20*    (2006.01)
*G06T 11/40*    (2006.01)
*G06T 15/80*    (2011.01)
*G09G 5/02*    (2006.01)
*G06F 3/12*    (2006.01)
(Continued)

(52) U.S. Cl.
CPC .......... *G06T 11/203* (2013.01); *G06F 3/1218* (2013.01); *G06F 3/1225* (2013.01); *G06F 3/1284* (2013.01); *G06K 15/1874* (2013.01); *G06T 11/40* (2013.01); *G06T 15/80* (2013.01); *G09G 5/02* (2013.01); *G09G 5/026* (2013.01); *G06F 3/1244* (2013.01); *G06K 9/00456* (2013.01); *G09G 2340/06* (2013.01)

(58) Field of Classification Search
CPC ..... G06F 3/1284; G06F 3/1244; G06T 11/203
USPC .................. 715/256, 234, 270, 276, 211, 255
See application file for complete search history.

(56) References Cited

U.S. PATENT DOCUMENTS 8,726,370 B2 * 5/2014 Minegishi ............. G06F 21/608
                                                         726/19
9,141,784 B2 * 9/2015 Ono ......................... G06F 21/51
(Continued)

FOREIGN PATENT DOCUMENTS

WO    2016088345 A1    6/2016

*Primary Examiner* — Stephen S Hong
*Assistant Examiner* — Matthew J Ludwig
(74) *Attorney, Agent, or Firm* — Laurence A. Greenberg; Werner H. Stemer; Ralph E. Locher

(57) ABSTRACT

A method for improving the print quality of graphic elements, in particular vectorized letter graphics, in PDF documents in the prepress stage of a printing process by using a computer, includes analyzing the page content of the PDF document by using the computer and saving the page content in a suitable data structure, searching the data structure for graphic elements, in particular letter graphics, that fulfill specific predefined criteria relating to an evaluation of the height and width of the graphic paths of graphic elements that are present in the PDF document, by using the computer, converting the selected graphic elements into image masks by rendering the selected graphic elements on the computer and substituting the generated image masks for the originally selected graphic elements in the PDF document by using the computer. The PDF document with the generated image masks are printed on a printing machine.

9 Claims, 4 Drawing Sheets

(51) Int. Cl.
*G06K 15/02* (2006.01)
*G06K 9/00* (2006.01)

(56) References Cited

U.S. PATENT DOCUMENTS

| | | |
|---|---|---|
| 9,547,628 B2 * | 1/2017 | Mangalam ............ G06F 17/214 |
| 2004/0189638 A1 | 9/2004 | Frisken et al. |
| 2008/0100624 A1 * | 5/2008 | Matsunaga ............ G06T 11/203 |
| | | 345/469.1 |
| 2009/0213422 A1 * | 8/2009 | Ono ................... G06K 15/1836 |
| | | 358/1.15 |
| 2015/0002529 A1 | 1/2015 | Liu et al. |

\* cited by examiner

METHOD FOR IMPROVING THE PRINT QUALITY OF GRAPHIC ELEMENTS

CROSS-REFERENCE TO RELATED APPLICATION

This application claims the priority, under 35 U.S.C. § 119, of German Patent Application DE 10 2016 214 811.7, filed Aug. 10, 2016; the prior application is herewith incorporated by reference in its entirety.

BACKGROUND OF THE INVENTION

Field of the Invention

The present invention relates to a method for improving the print quality of graphic elements, in particular vectorized letter graphics, by using image masks.

The technical field of the invention is the field of digital prepress operations.

In the printing industry, a job file containing all of the information necessary to process a print job is created in the workflow systems of the print shops. That job information is frequently saved in so-called JDF, i.e. job definition files. The JDF refer to job content data in the Page Description Format (PDF). As a consequence, they have all of the advantages and disadvantages inherent in the PDF standard. In accordance with the PDF standard texts, for instance, are usually drawn in True Type or Type 1 fonts. Those fonts have various internal information, for instance on hinting, width, cap height, etc., which allow Adobe or other creators of interpreters to attain optimum results especially at lower print resolutions.

However, for graphic elements in a PDF, especially fonts that have been converted into graphics, only a contour description is available in the PDF-internal graphic format in the form of cubic Bézier curves. There is no internal font information that might be used for the required rendering. The workflow system processing the PDF does not even know that it is a font. Now such letter graphics exhibit a particularity of the PDF standard for the screening of graphics. As soon as the line of an area to be filled touches a pixel, the pixel is filled, no matter what the proportion of overlap of the line in the pixel actually is. That means that the pixel is filled, no matter whether 90% or only 10% of a screen pixel are covered by a line. As a consequence, on average, letter graphics are printed too fat by half a pixel on every side. The smaller or more delicate the font of the letter graphic is or the lower the print resolution, the greater the problem. That is an important aspect in particular for digital printing systems such as inkjet.

In accordance with the prior art, a solution to that problem is to use a specific graphics renderer that only fills a pixel if it is covered by more than 50% by the line of the letter graphic. An advantage of that process is that on average, the graphics always have the correct thickness. A disadvantage is, however, that when the renderer is applied to all graphic objects in the PDF, very thin lines may disappear completely. Another disadvantage is that the 50% system is not part of Adobe's PDF standard. Thus, the problem cannot be solved by applying the PDF standard alone.

Another prior art approach to solving that problem is to subtract half a pixel, for instance, from every letter graphic present in the PDF by calculating parallel contours. That is done to compensate for the effect of the too bold type in the subsequent application of the PDF-internal rendering process. Disadvantages of that approach are, however, that it is computationally intensive and that for different fonts and sizes of the letter graphic, different widths need to be subtracted. Thus, it is a cumbersome process that is not often used in practice.

Another prior art approach is disclosed in International Publication WO 2016/088345 A1, which describes a system for recognizing and editing handwritten letter graphics in a PDF. However, that document refers to OCR handwriting recognition in PDF documents, in particular to converting handwritten graphics into editable text. The document does not disclose any solution to the problem of too bold letter graphics caused by the PDF-internal rendering process.

SUMMARY OF THE INVENTION

It is accordingly an object of the invention to provide a method for improving the print quality of graphic elements, which overcomes the hereinafore-mentioned disadvantages of the heretofore-known methods of this general type and which solves the problem of letter graphics being too bold in PDF documents.

With the foregoing and other objects in view there is provided, in accordance with the invention, a method for improving the print quality of graphic elements, in particular vectorized letter graphics, in PDF documents in the prepress stage of a printing process by using a computer, the method comprising the following steps:

1. analyzing the page content of the PDF document by using the computer and saving the page content in a suitable data structure,
2. searching the data structure for graphic elements, in particular letter graphics, that fulfill specific predefined criteria by using the computer,
3. converting the selected graphic elements into image masks by rendering the selected graphic elements on the computer,
4. substituting the generated image masks for the originally selected graphic elements in the PDF document by using the computer, and
5. printing the PDF document with the generated image masks on a printing machine.

The core element of the method is to search the PDF document for graphic elements, in particular letter graphics, that fulfill criteria suitably selected by the operator. These criteria allow only those letter graphics to be selected that would probably suffer from the too-bold print problem after rendering at the low resolution that is used while ignoring those graphic elements that are too thin or delicate, e.g. long and thin lines, and would disappear as it is known in the prior art if the method of the invention was applied. The letter graphics that have been selected in this way are then converted into so-called image masks in a rendering process. The image masks are just bitmaps that allow individual pixels within a rectangular area to be marked as "on" i.e. filled with a color, or "off" i.e. transparent. The original letter graphics in the PDF document are then replaced by the image masks that have been created in this way. The resultant PDF document that has been modified in this way may then be used for the printing process in a conventional way. During the print output, the standard screening of graphic elements in the PDF is circumvented, eliminating the too-bold effect of the letter graphics.

An additional aspect of the invention in this context is that the specific preselected criteria contain an evaluation of the height and width of the graphic paths of letter graphics that are present in the PDF document. One way to recognize letter graphics that are likely to result in too bold outputs is, for instance, simply to check whether all paths of a graphic do not exceed a predefined height or width. Graphic content that represents a 10-point-size font is very unlikely to include any paths having a height or width which exceeds 10 points. The application of these criteria allows the operator to make the appropriate selection of the letter graphics that are present.

Advantageous and thus preferred further developments of the present invention will become apparent from the associated dependent claims as well as from the description and the associated drawings.

Another preferred development of the method of the invention in this context is that a rule is applied to render the selected letter graphics, the rule ensuring that only those pixels in the screen are filled that the line of the letter graphic overlaps by a specific proportion of the pixel. Then any desired rendering technology is applied to the selected letter graphics that meet the selected criteria. The applied method preferably uses a rule stipulating that only those pixels are filled that the line of the letter graphic fills to a specific minimum proportion of the pixel in the screen. Thus, the effect of too-bold type may be avoided for the selected letter graphic.

A further preferred development of the method of the invention in this context is that the specific amount of overlap between the pixel and the line of the letter graphic needs to be 50%. The preferred rule is a 50% rule. Such a rule has been found to be most efficient in terms of avoiding the too-bold letter effect.

An added preferred development of the method of the invention in this context is that the resolution of the image masks and the print resolution of the printing machine are identical. In order for the original letter graphics to be replaceable 1-to-1 by the image masks that have been treated in a corresponding way, their resolution needs to be identical with the resolution of the printing machine.

An additional preferred development of the method of the invention in this context is that adjacent letter graphics are combined to form one letter graphic before they are replaced by a common image mask. Since letter graphics are frequently created as one graphic for every letter, it may be expedient in this case to combine adjacent graphics in a first step to reduce the number of image masks that need to be created. This makes the method of the invention more efficient because the number of letter graphics that need to be created is reduced.

Still another preferred development of the method of the invention in this context is that the replacement of the original letter graphics is carried out at a point in the prepress workflow of the printing process where the page content of the PDF document is processed and/or optimized. The conversion of the letter graphics into an image mask may be carried out at any desired point in the workflow where PDF content is processed. However, it is expedient for it to take place at a point during the workflow where the page content of the PDF document is processed and in particular optimized anyway.

Still an added preferred development of the method of the invention in this context is that the replacement of the original letter graphics is integrated directly into the output of the PDF document, eliminating the need for saving the page content of the PDF document in the appropriate data structure. The automation of replacing the letter graphics by image masks may be integrated directly into the PDF output. Some PDF output systems offer interfaces that provide internal processing of page content without the need for saving corresponding changes in the file system. In this case, the replacement of the letter graphic by the image mask is only implemented in a representation of the PDF page in the memory.

Still an additional preferred development of the method of the invention in this context is that the PDF document including the generated image masks is printed on a digital printing machine such as an inkjet printing machine. Since the problem of too-bold letter graphics mainly occurs at low resolutions—with "low" having to be put into context—the method of the invention is particularly useful for digital printing machines, which currently operate at lower resolutions than other types of printing processes such as lithographic offset printing.

A concomitant preferred development of the method of the invention in this context is that in addition to the automatic search carried out by using the computer to find graphic elements in the data structure, it is possible for an operator to use a PDF editor to make a manual selection of the graphic elements to be converted to image masks. It is to be understood that if the user knows from the start that there are specific graphic elements such as letter graphics that are to be converted to image masks, these graphic elements may manually be marked for conversion by using a PDF editor integrated in the workflow. Such a manual selection is also useful for selecting graphic elements that may not meet the criteria of the automated process.

Other features which are considered as characteristic for the invention are set forth in the appended claims.

Although the invention is illustrated and described herein as embodied in a method for improving the print quality of graphic elements, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings. The invention as well as further developments of the invention that are advantageous in structural and/or functional terms will be explained in more detail below with reference to the associated drawings and based on at least one exemplary embodiment.

DETAILED DESCRIPTION OF THE INVENTION

Figure 3:
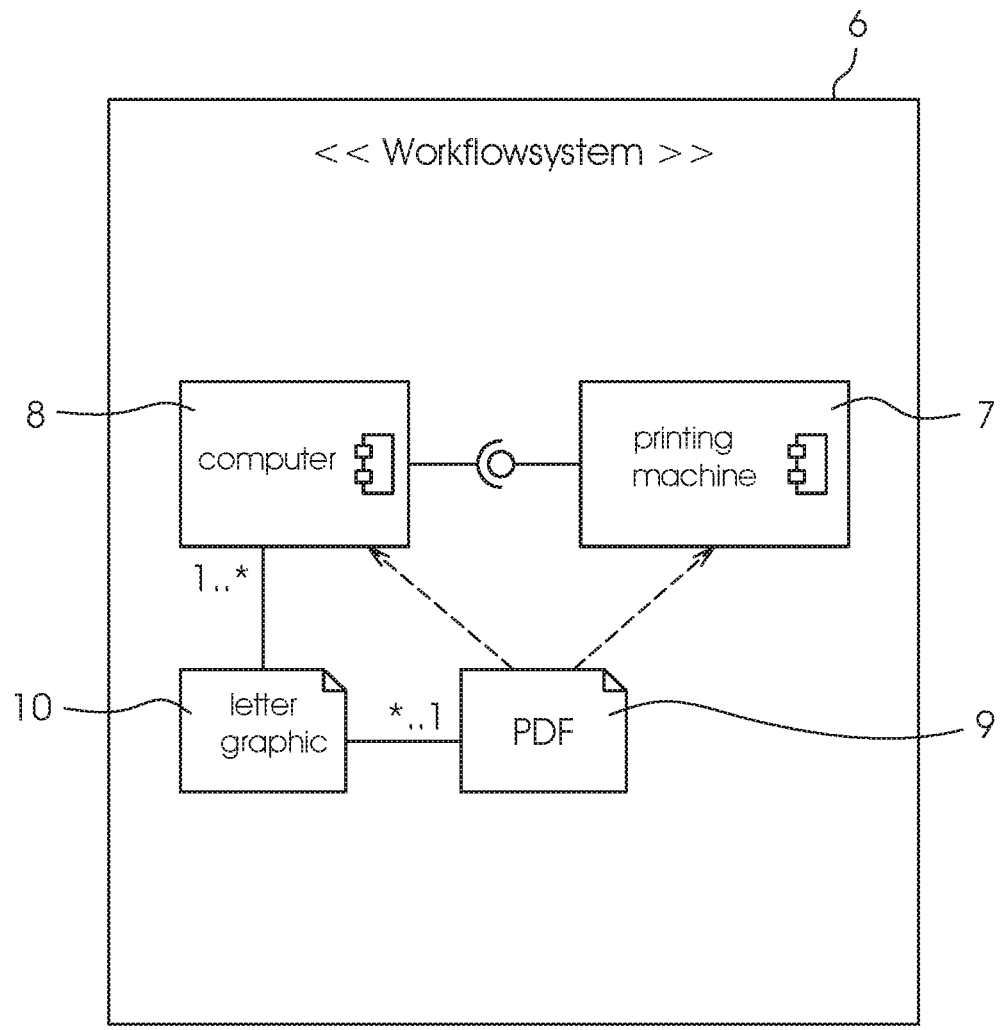
FIG. 3 is a block diagram illustrating an applied workflow system.
Figure 4:
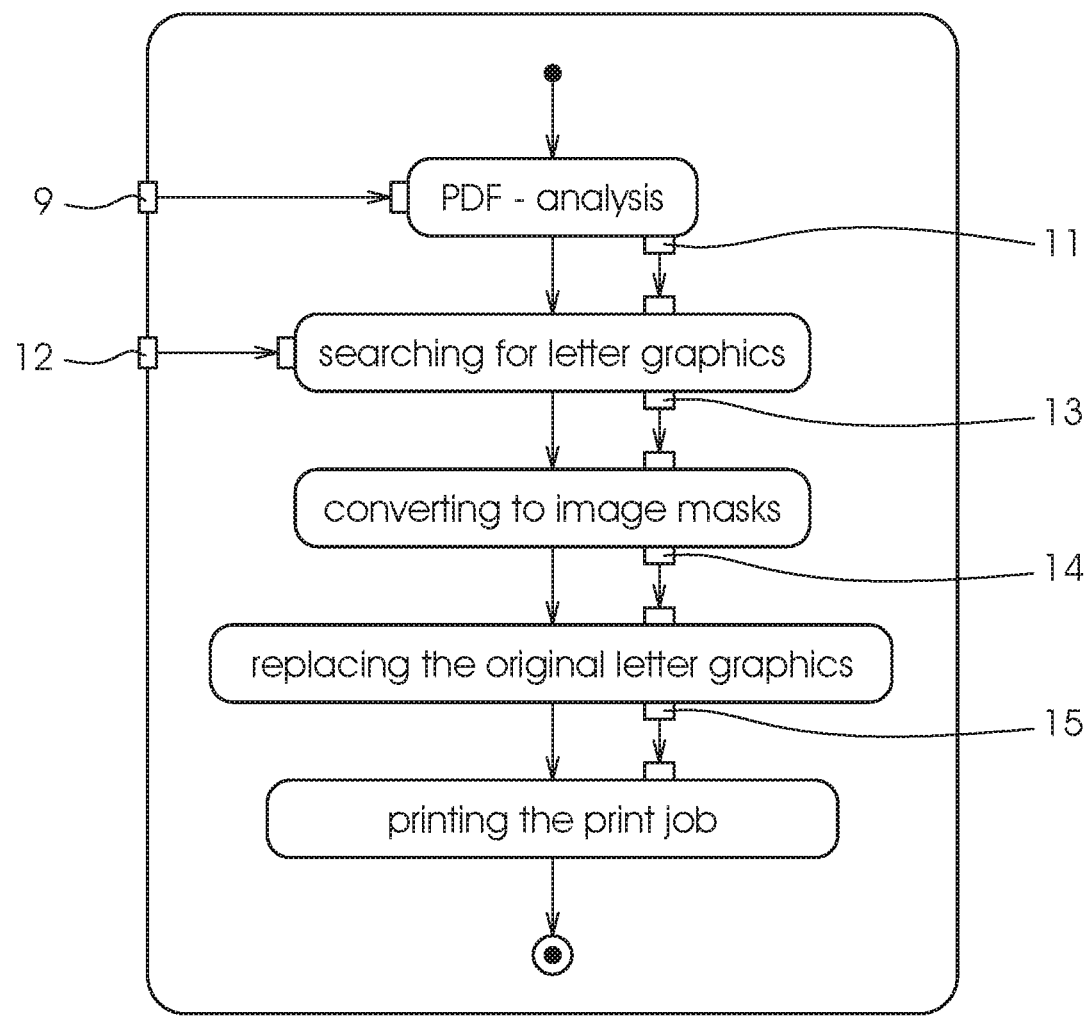
FIG. 4 is a flow chart of the method of the invention.

Referring now in detail to the figures of the drawings, in which identical reference symbols identify mutually corresponding elements, and first, particularly, to FIG. 4 thereof, there is seen a diagrammatic representation of a fundamental sequence of steps of a preferred embodiment of the method of the invention. A PDF 9 contains one or more pages 11, which contain one or more text graphics 10. A computer 8 of the workflow system 6 analyzes the PDF page content 11 of the PDF 9 and saves it in a suitable data structure that describes the entire content of a page 11. The structure of the workflow system 6 is shown in more detail in a block diagram in FIG. 3. A first step is to search this data structure for colored, filled graphics 10 meeting criteria 12, which are parameterizable by the user. Based on the criteria 12 that may be parameterized by the user, the computer 6 or rather a suitable program running on the computer 6 and implementing the method of the invention searches the PDF page content 11 for letter graphics 10 that meet the criteria 12 parameterized by the user. A conceivable criterion 12 is, for example, simply to check whether all paths of a graphic 10 do not exceed a predefined height or width. A graphic 10 representing a font in an original 10-point size will be very unlikely to include any paths having a height or width which is greater than 10 points. This allows those letter graphics 13 to be found in the PDF page content 11 that are prone to the phenomenon of too-bold type but at the same time are not thin enough for the letter graphic 13 to disappear when the method of the invention is implemented.

Figure 1:
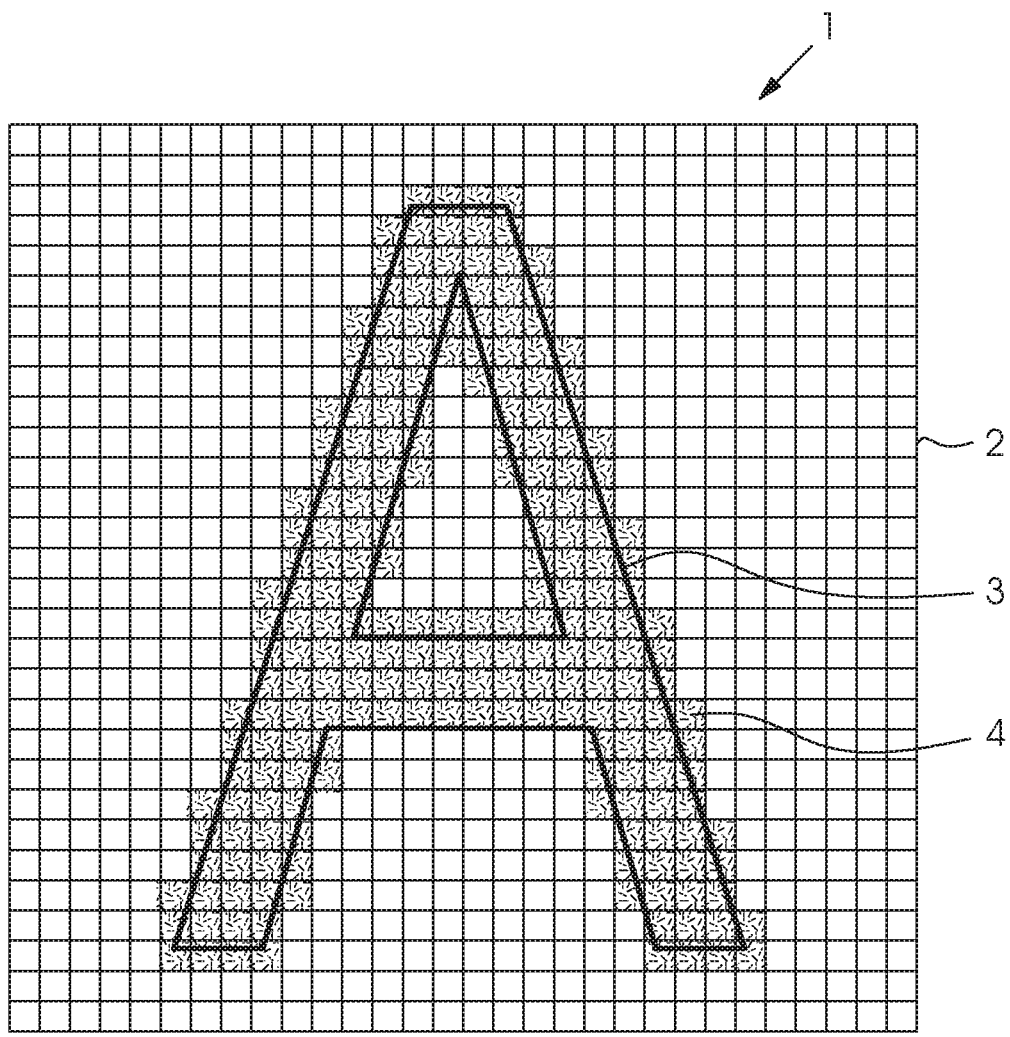
FIG. 1 is a diagrammatic, top-plan view of an example of a letter graphic after an application of a standard PDF screening process.

FIG. 1 illustrates an example of a letter graphic 1 that exhibits the problem of too-bold type printing. It is clearly visible that all screen pixels 4 in a background screen 2, even those having only a small part which is covered by a line 3 of the letter graphic, are filled in the rendering process, resulting in too-bold lettering.

Figure 2:
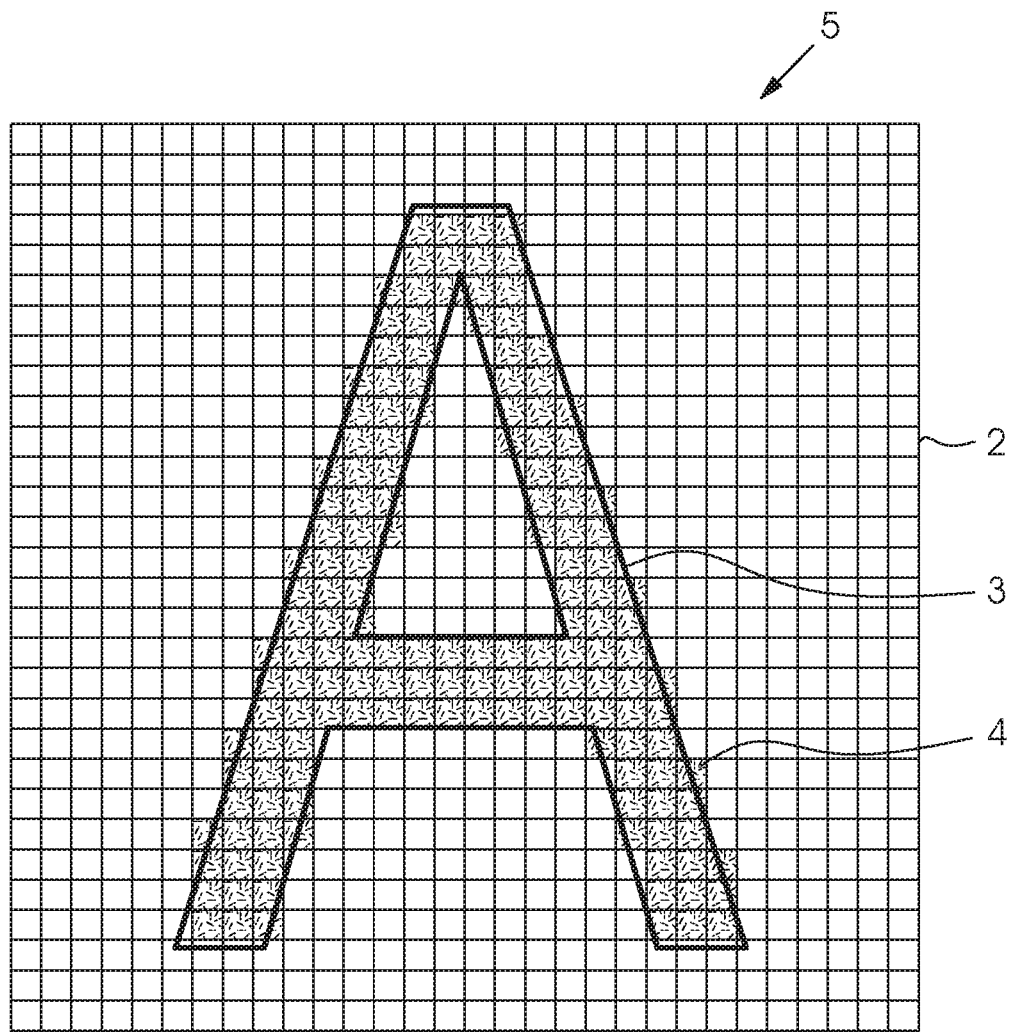
FIG. 2 is a top-plan view of an example of a letter graphic after an application of a process that applies the 50% rule.

In the course of the method of the invention, the selected letter graphics 13 are then converted to image masks 14 of the required print resolution. This conversion relies on rendering technology that does not fill every pixel that is touched by the line as is done in accordance with the PDF standard, but uses a 50% rule instead. This means that only pixels 4 that are overlapped by a minimum of 50% by the line 3 of the letter graphic 13 are set in the image mask 14. The result of such a 50% rendering process can be seen in FIG. 2. The letter graphic 5 screened in a corresponding way is much thinner than the one representing the PDF standard in FIG. 1. The image masks 14 are suitable for use in the 50%-rule rendering process because they allow individual pixels 4 within a rectangular surface to be masked as "on" i.e. filled with ink, or "off" i.e. transparent with a background that shines through, allowing the same fill colors in the PDF 9 as normal graphics. The original letter graphics 13 that have been converted into image masks 14 are then replaced in their exact locations by the image masks 14 that have been created on the basis of the original graphics. As a result of the use of the criteria 12 that have been parameterized by the user, graphics that correspond to very thin and long line elements that might disappear if the 50% rendering was applied are ignored.

When the PDF 15 is printed, the image masks 14, having a resolution which precisely matches the print resolution, are reproduced 1-to-1, circumventing the too-bold type effect. This PDF 15 may then be used in the printing operation for completing a print job in a printing machine 7. The preferred embodiment of the method of the invention is implemented at a point in the workflow system 6 where the PDF content 11 is processed.

The following is a summary list of reference numerals and the corresponding structure used in the above description of the invention:

LIST OF REFERENCE SYMBOLS 1 rendered graphic element with too bold output
2 low-resolution background screen
3 letter line
4 filled pixel of the rendered graphic element
5 rendered graphic element with too correct output
6 workflow system
7 printing machine
8 computer
9 PDF including graphic elements
10 graphic element present in the PDF
11 PDF page content
12 selection criteria parameterized by the operator
13 selected graphic elements
14 converted image masks
15 PDF including substituted image masks

The invention claimed is:

1. A method for improving the print quality of graphic elements in the form of letter graphics in PDF documents of a prepress stage of a printing process by using a computer, the method comprising the following steps:
  using the computer to analyze page content of the PDF document and saving the page content in a data structure;
  using the computer to search the data structure for graphic elements in the form of letter graphics fulfilling preselected criteria relating to an evaluation of a height and width of graphic paths of the graphic elements being present in the PDF document;
  in response to the search for graphic elements in the form of letter graphics fulfilling preselected criteria relating to the evaluation, selecting graphic elements not exceeding a predefined height or width of the graphic paths of the graphic elements being present in the PDF document;
  converting the selected graphic elements into image masks by rendering the selected graphic elements on the computer;
  using the computer to substitute the image masks for the selected graphic elements in the PDF document; and
  printing the PDF document with the image masks on a printing machine.

2. The method according to claim 1, which further comprises applying a rule to render the selected graphic elements and using the rule to only fill pixels in a screen that a line of the graphic elements overlaps by a proportion of each pixel in the screen.

3. The method according to claim 2, wherein the proportion of each pixel that the line of the graphic elements needs to overlap is 50%.

4. The method according to claim 1, wherein a resolution of the image masks and a print resolution of the printing machine are identical.

5. The method according to claim 1, which further comprises initially combining adjacent graphic elements to form a common graphic element before the adjacent graphic elements are replaced by a common image mask.

6. The method according to claim 1, which further comprises implementing the substituting of the selected graphic elements at a point in a workflow of the prepress stage of the printing process where at least one of a processing or optimization of the page content of the PDF document is carried out.

7. The method according to claim 1, which further comprises integrating the substituting of the selected graphic elements directly into an output of the PDF document, eliminating a need for saving the page content of the PDF document in the data structure.

8. The method according to claim 1, which further comprises printing the PDF document with the image masks on a digital on a digital printing machine or an inkjet printing machine.

9. The method according to claim 1, which further comprises in addition to the search for graphic elements in the data structure, permitting a user to use a PDF editor to make a manual selection of the graphic elements to be converted into image masks.

* * * * *